United States Patent
Meier

(10) Patent No.: US 6,430,923 B1
(45) Date of Patent: Aug. 13, 2002

(54) LOOP FLUSHING CIRCUIT

(75) Inventor: Siegfried M. Meier, Ankeny, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 09/642,296

(22) Filed: Aug. 18, 2000

(51) Int. Cl.[7] .............................................. F16D 31/02
(52) U.S. Cl. ......................................... 60/464; 60/494
(58) Field of Search ........................... 60/464, 494, 468

(56) References Cited

U.S. PATENT DOCUMENTS

| | | | | |
|---|---|---|---|---|
| 3,435,615 A | * | 4/1969 | Genz et al. ................ | 60/464 X |
| 3,593,519 A | * | 7/1971 | Fuhrimann ................ | 60/464 X |
| 4,373,869 A | * | 2/1983 | Martin et al. ............. | 60/468 X |
| 4,779,417 A | * | 10/1988 | Kita .......................... | 60/464 X |
| 5,613,361 A | * | 3/1997 | Dantigraber et al. ...... | 60/464 X |
| 6,145,312 A | * | 11/2000 | Hauser et al. ............. | 60/464 |

FOREIGN PATENT DOCUMENTS

| | | | |
|---|---|---|---|
| DE | 24 22 482 A1 | 5/1974 | |
| DE | 195 05 691 A1 | 2/1995 | |
| RU | 414380 | * 7/1974 | ............ 60/464 |

* cited by examiner

Primary Examiner—John E. Ryznic

(57) ABSTRACT

A loop flushing circuit includes a loop flushing valve that is connected to the low pressure system line in a hydrostatic transmission for selectively bleeding fluid therefrom to the case drain without relying on a shuttle valve to identify the low pressure line. The loop flushing valve is adaptable to electrical or electro-hydraulic actuation by a microcontroller. Thus, the timing of loop flushing can be controlled based upon various system operating conditions or input values. Loop flushing with this circuit avoids adversely impacting control characteristics of the transmission, can be defeated around neutral, and can provide single-sided loop flushing.

14 Claims, 4 Drawing Sheets

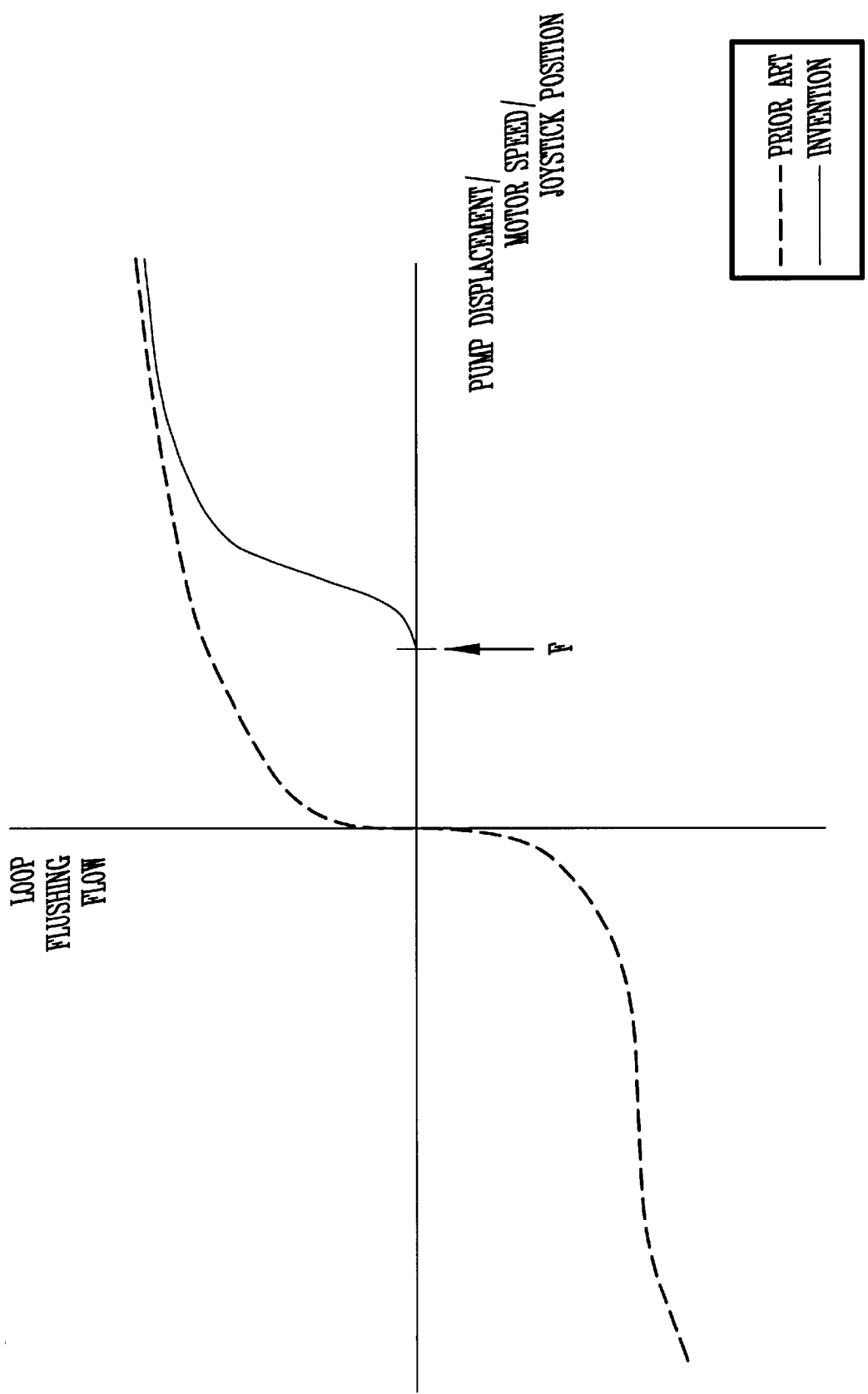

LOOP FLUSHING CIRCUIT

BACKGROUND OF THE INVENTION

The present invention relates to closed circuit hydrostatic drives for propelling mobile working vehicles. More particularly, this invention relates to a loop flushing circuit for closed circuit hydrostatic transmissions.

In closed circuit hydrostatic transmissions that include at least one variable displacement pump, and at least one fixed or variable displacement motor, the power transmitting medium (typically oil) is kept contained within a closed loop circuit with the exception of leakage from the variable displacement pump(s) and the motor(s). A fixed displacement charge pump is generally used with the closed loop circuit to replace occurring leakage by pumping oil out of a separate oil reservoir and into the closed loop hydraulic circuit. The oil kept in the reservoir is normally of lower temperature than the oil removed from the closed loop circuit. This is because the oil in the reservoir generally has been cooled by means of an oil cooler also included in the overall system. The oil in the closed loop circuit should not exceed a temperature harmful for the functionality of the oil and the components used in closed loop circuit.

At certain operating conditions, however, especially when running hydrostatic transmissions at low operating loads (system pressure) concurrently with high pump and/or motor speed, additional means are necessary to maintain a desired operating temperature of the oil in the closed loop circuit. A high amount of heat can be generated within the closed circuit due to low leakage in the pump and motor at low operating loads, resulting in a small amount of oil being exchanged between the closed loop circuit and the reservoir. Also heat generation due to line losses within the closed circuit tends to be high because of the high speed condition. Conventional loop flushing valves are common means to allow for additional hot oil to be removed from the closed loop circuit, which results in a greater volume of oil being exchanged with the reservoir. This oil is replaced by means of a charge pump in the same manner as the oil removed from the closed loop circuit due to leakage in the pump(s) and motor(s). Secondly, the continuous exchange of oil from the closed loop circuit allows for the removal of small contamination particles from the closed loop circuit, generated during normal operation, by means of an oil filter also included in the overall system. Conventionally, a loop flushing valve is installed in either the pump(s) or motors) (s), and includes a spring-centered loop flushing spool shuttle valve and a loop flushing relief valve. The shuttle spool valve connects the loop flushing relief valve with that side of the closed loop circuit that operates at the lower of the two pressure levels of the closed loop circuit. Therefore, only oil from the low-pressure side can be drained through the loop flushing relief valve out of the closed loop circuit.

For many vehicles equipped with a closed loop hydraulic propulsion circuit, especially mobile working vehicles, operating the vehicles at low vehicle speed (creeping speed) in both driving directions while repeatedly changing driving direction from forward to reverse, and vice versa, is a necessary requirement when maneuvering around certain obstacles, or driving towards other vehicles or objects involved in the working process. In order to maintain predictable and repeatable vehicle performance under low vehicle speed operating conditions, it is required that the transmission of propel energy occurs steadily and without any sudden changes from the prime mover to the wheels or tracks of the vehicle. Having a loop flushing valve according to the prior art included in the propulsion system of said vehicles, however, can cause sudden changes of the transmission of energy resulting in unpredictable and nonrepeatable, and therefore uncontrollable vehicle movements. When driving a low vehicle speed and changing driving direction between forward and reverse or vice versa, the side of higher load (system pressure) in the closed loop propel circuit is changing from one side to the other and vice versa. Conventional loop flushing valves, the loop flushing relief valve are intended to be connected, via the loop flushing shuttle spool valve, to that side of the closed loop circuit that operates at the lower system pressure. This means the loop flushing shuttle spool has to shift every time the vehicle direction changes. Due to the dynamics of the loop flushing shuttle spool valve (spring—mass—damper—system), the shift of the shuttle spool is delayed, and does not occur instantaneously when the vehicle driving direction is changed. Therefore, for a short moment, the side of the closed loop circuit propel system with the higher operating pressure is connected to the loop flushing relief valve using some of the pressurized oil on the high pressure side of the closed loop circuit, intended for the transmission of hydraulic energy into mechanical energy within the hydraulic motor(s), to be flushed out of the closed loop circuit prior to being used in the intended way. When the loop flushing shuttle spool eventually shifts to the required position, connecting the low pressure side of the closed loop circuit to the loop flushing relief valve, the flushing flow out of the high pressure side of the loop is interrupted, and all of the pressurized oil on the high pressure side of the closed loop circuit is again transmitting hydraulic energy into mechanical energy within the hydraulic motor(s) as intended. This change, however, causes a sudden step increase in propel energy transmitted from the engine to the wheels of the vehicle, making its driving performance unpredictable and non-repeatable.

Beyond operating vehicles back and forth at low speed, vehicles very often are used predominantly for driving in only one direction, normally the forward direction. Others are equally used for driving forward and reverse, however, are only operated at low vehicle speed when going in reverse. Therefore, the closed loop hydraulic circuit cannot overheat while driving in reverse even when operating without any loop flushing valve.

From the foregoing it can be seen that there is a need for an improved loop flushing circuit. Therefore, a primary objective of the present invention is the provision of an improved loop flushing circuit.

Another objective of this invention is the provision of a loop flushing circuit that performs the usual loop flushing functions or requirements of cleaning and cooling without negatively interfering with the controllability requirements of hydrostatic propel systems.

Another objective of this invention is the provision of a loop flushing circuit that includes an electronically actuated loop flushing valve which can be controlled by a microprocessor and thereby adjusted through software or parameter alterations to optimize system operating temperatures for maximum performance and durability.

Another objective of this invention is the provision of a loop flushing device that has few components.

Another objective of this invention is the provision of a loop flushing circuit that is durable, reliable and economical to produce.

Another objective of this invention is the provision of a loop flushing circuit wherein loop flushing is adjustable depending on certain operating conditions such as control joystick position, pump displacement, motor speed, or pump output flow direction.

Another objective of this invention is the provision of a loop flushing circuit wherein loop flushing is defeated around neutral (where pump displacement is near zero).

Another objective of this invention is the provision of a loop flushing circuit that utilizes an electrical or electro-hydraulic two-position solenoid valve for selectively bleeding fluid from the high pressure system line to a case drain.

SUMMARY OF THE INVENTION

The present invention relates to a loop flushing circuit for a closed loop hydrostatic transmission. The loop flushing circuit includes a variable displacement hydraulic pump fluidly connected to a hydraulic motor by first and second system pressure lines, a case drain line associated with at least one of the motor and pump, and a two-port loop flushing valve fluidly connected to only one side of the loop.

The loop flushing valve has an open position in which loop oil is bled to the case drain line and a closed position wherein the valve blocks such flow.

The two-port valve can be solenoid-operated and controlled by a microcontroller that also controls the displacement of the pump and the direction of fluid flow in the closed loop circuit. The microcontroller electrically connects to the solenoid of the loop flushing valve and generates a signal to open the valve whenever a predetermined system condition or input value is achieved. The predetermined system operating condition or input value can include, but is not limited to, pump displacement, motor speed, control or joystick position. The microcontroller can be programmed so as to adjust or select the point at which the loop flushing valve is energized so that flushing occurs. Loop flushing can thus be defeated around the neutral condition of the transmission.

BRIEF DESCRIPTION OF THE DRAWINGS

FIG. 4 is a graph depicting the performance characteristics and adjustability of the loop flushing circuit of this invention versus a prior art loop flushing valve such as shown in FIGS. 1 and 2.

DETAILED DESCRIPTION OF THE PREFERRED EMBODIMENT

Figure 1:
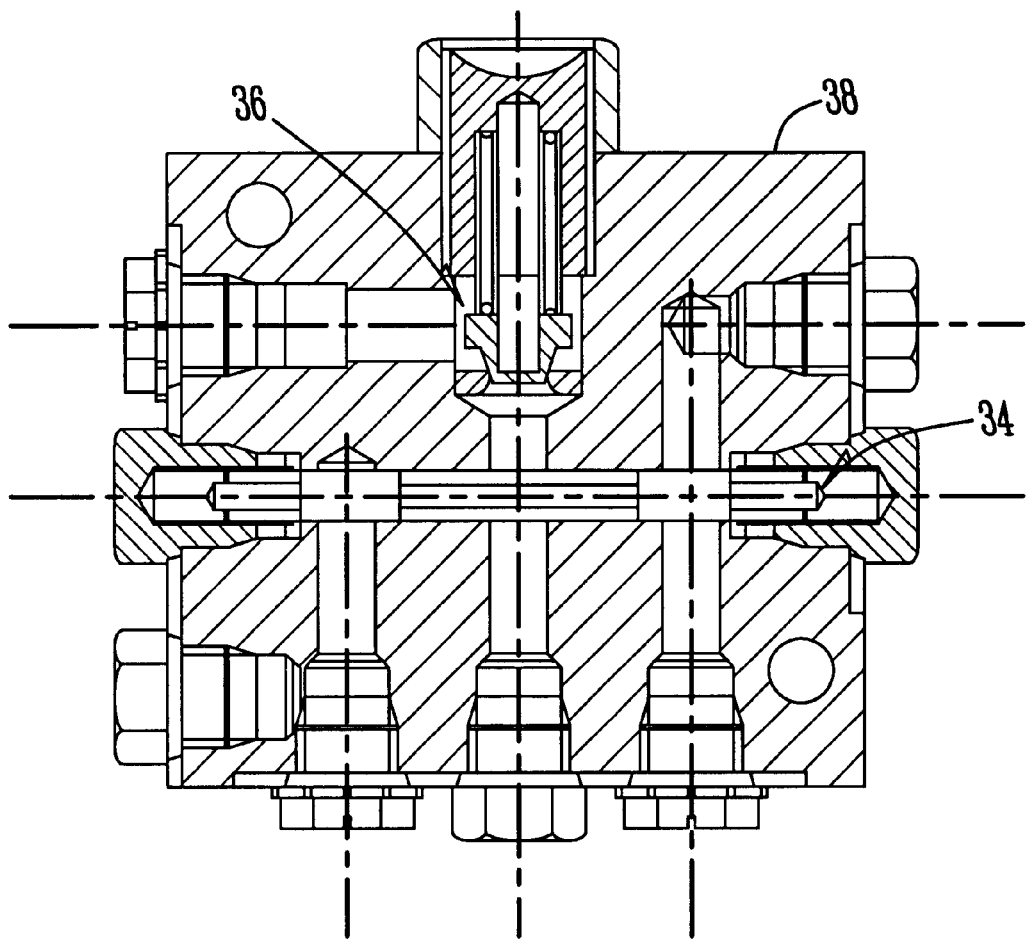
FIG. 1 is a cross-sectional view of a conventional loop flushing valve.
Figure 2:
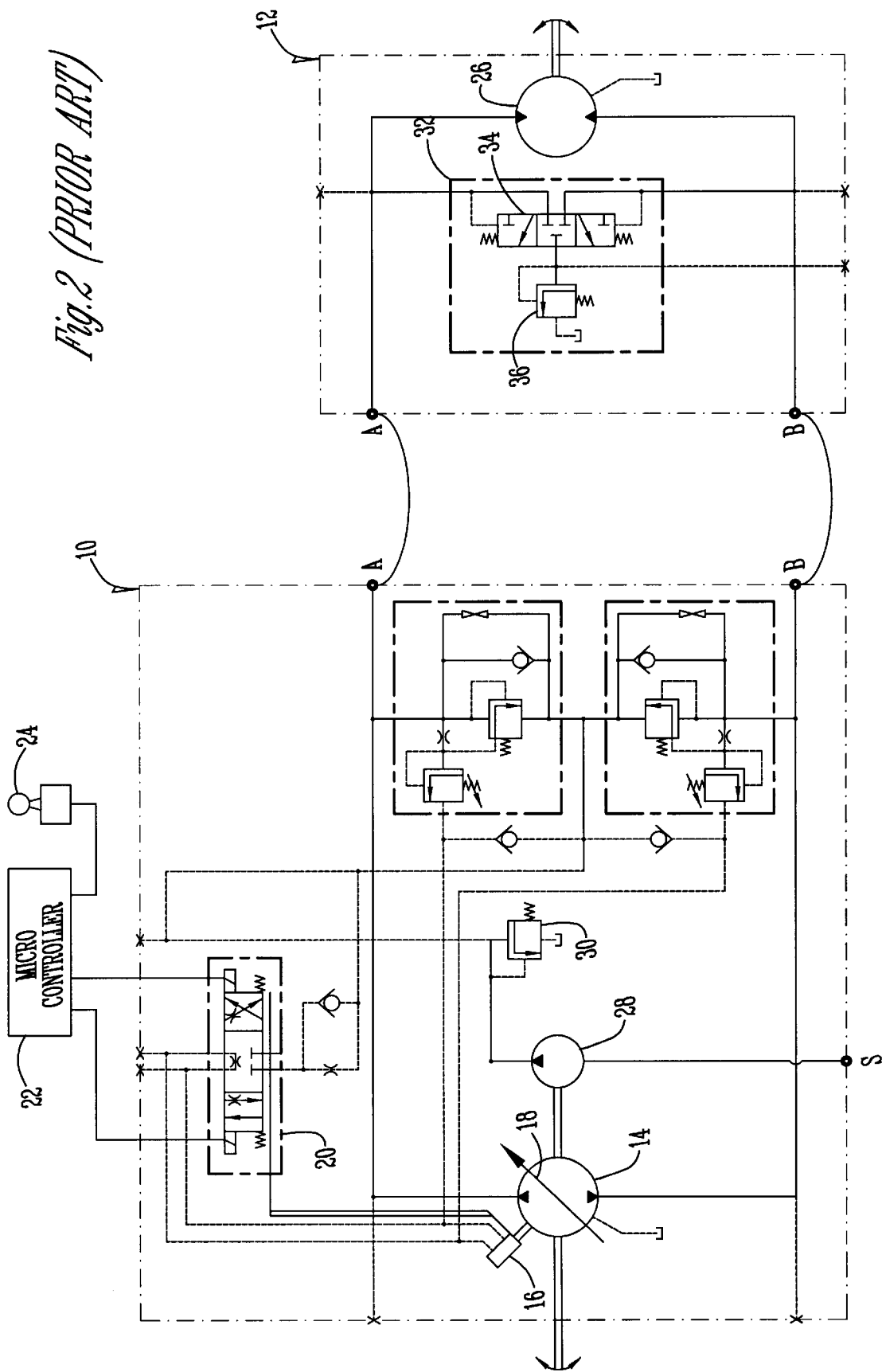
FIG. 2 is a combined hydraulic and electric circuit diagram of a hydrostatic transmission that includes a conventional loop flushing valve arrangement.

FIGS. 1 and 2 depict a prior art loop flushing valve arrangement. A pump module 10 fluidly connects to a motor module 12 in a closed loop circuit to define a hydrostatic transmission for propelling a working vehicle.

The pump module 10 includes a variable displacement hydraulic pump 14 driven by a conventional engine or prime mover (not shown). A servo mechanism 16 attached to the swashplate 18 of the pump varies the displacement of the pump 14. The servo mechanism 16 is connected to a spring-centered solenoid-operated displacement control valve 20. A programmable microcontroller 22 electrically connects to the displacement control valve 20 as shown. A joystick 24 allows the operator of the vehicle to input a command signal to the microcontroller 22. Based upon commands from the joystick 24, the microcontroller 22 positions the control 20, which in turn positions the swashplate 18 of the pump 14. Depending upon the position of the swashplate 18, the pump 14 has a fluid displacement that is infinitely variable between a neutral or zero displacement condition and full displacement conditions in both the forward and reverse directions.

The motor module 12 includes a hydraulic motor 26. A pair of first and second system pressure lines or passageways A, B connect the pump 14 with the motor 26 to form a closed loop circuit. A fixed displacement charge pump 28 couples with the pump shaft and replenishes any fluid losses that occur in the closed loop circuit. A charge pressure relief valve 30 establishes the charge pressure at which the charge pump 28 delivers fluid to the low pressure side of the loop. Other conventional valves for high pressure relief, bypass, and flow control are included in the pump module 10, but these valves are well known in the art and not particularly relevant to the present invention.

The conventional loop flushing system 32 shown in FIG. 2 includes two valves 34, 36. The first valve is a pilot-operated spring-centered three-position shuttle valve 34 that has three ports. Two of the ports are connected respectively to system pressure line A, B. The third port connects to a pilot pressure operated loop flushing relief valve 36. The three-position valve 34 identifies which system pressure line A, B that has the lowest pressure. Then the line A or B with the lower pressure connects to the loop flushing relief valve 36 through the valve 34 in order to bleed off oil for loop flushing purposes. Referring to FIG. 1, the valves 34 and 36 for loop flushing are conventionally situated in a common manifold block 38 mounted to the motor 26.

Figure 3:
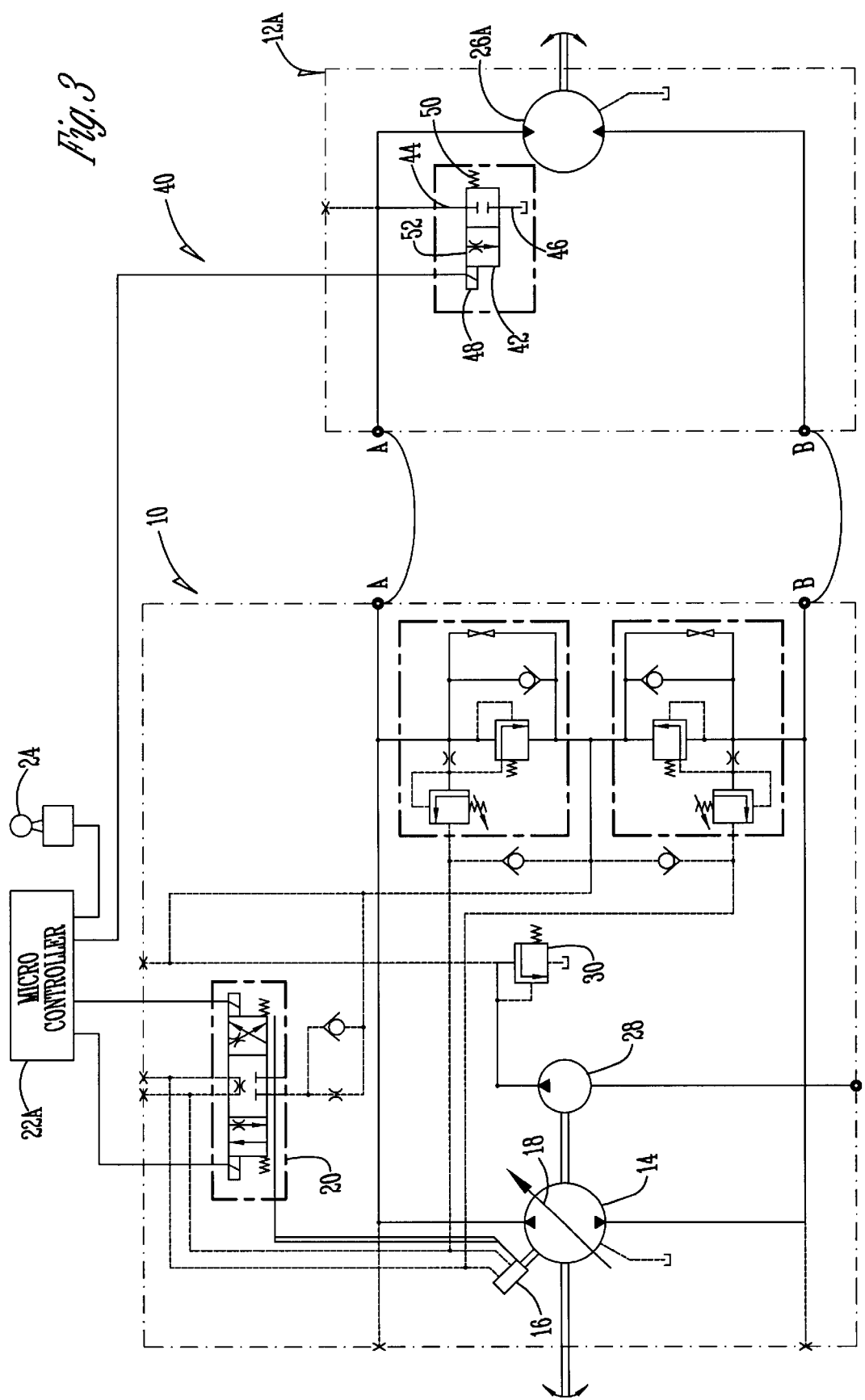
FIG. 3 is a combined hydraulic and electric circuit diagram of a hydrostatic transmission that includes the loop flushing circuit of this invention.

The loop flushing circuit 40 of the present invention is shown in FIG. 3. In the preferred embodiment shown, the pump module 10 is substantially the same as shown in FIG. 2. However, the microcontroller 22A comprises a programmable control electrically connected to the solenoid 48 of a twoport two-position loop flushing relief valve 42. Thus, the microcontroller 22A electronically or electro-hydraulically actuates or energizes the valve 42. The loop flushing valve 42 has an inlet port designated by the reference numeral 1 that is connected by a line 44 to only one of the system pressure lines A or B (A in the case shown). The loop flushing relief valve 42 also has an outlet port 2 connected to a case drain line 46 associated with the motor 26A. Alternatively, the valve 42 and/or the case drain line 46 could be associated with the pump 14 instead of the motor 26A without detracting from the invention.

Thus, the loop flushing circuit 40 of the present invention includes a variable displacement hydraulic pump 14, a hydraulic motor 26A fluidly connected to the pump 14 in a closed loop circuit by first and second system pressure lines A, B. The first and second system pressure line A or B each has respective pressure therein. Whenever the pump has a non-zero displacement or is moved away from the neutral position, one of the system lines A or B has a higher pressure than the other of the system pressure lines. A two-port loop flushing valve 42 has an inlet port connected to only one of the system pressure lines A or B (preferably the one with the lowest pressure) and has an outlet port selectively connected to the case drain line 46. The loop flushing valve 46 has a non-active or de-energized open first position wherein the system pressure line to which the inlet port is connected and the case drain line are fluidly connected. The loop flushing valve 42 has a closed second position wherein fluid flows between the system pressure line to which the inlet port is connected and the case drain line 46 is blocked.

Preferably, the valve 42 is a solenoid-operated two-positioned electro-hydraulic valve that is electrically connected to the microcontroller 22A. The microcontroller 22A connects to the pump 14 so as to control its displacement and the direction of fluid flow in the closed loop circuit. The microcontroller 22A generates a signal to open the normally closed loop flushing valve whenever a predetermined system condition or input value is achieved. The predetermined system condition or input value can be a given value of pump displacement, a given hydraulic motor speed, or a given position of the joystick 24.

In the preferred embodiment shown, the pump 14 is a bi-directional pump, the motor 26A is a fixed displacement motor, and the loop flushing valve 42 connects to the lower pressure system line A if flow is in the counter-clockwise direction in the closed loop circuit. However, one skilled in the art will appreciate that a uni-directional pump and one or more variable displacement motors can be utilized without detracting from the present invention. The loop flushing relief valve 42 can be associated with the pump 14 instead of the motor 26A.

In operation, the loop flushing valve 42 acts as a bleed valve. In the absence of current, the valve 42 is urged by spring 50 into the closed position shown. Little or no oil passes through from the closed loop circuit to the case drain when the valve 42 is closed. In the closed position, the bleed valve 42 can withstand the high oil pressures typically seen in closed loop circuit hydraulic propelled system without any degradation in performance or life. In the energized position, the bleed valve 42 opens a connection between the closed loop hydraulic circuit and the case drain 46, thereby allowing oil to flow from the loop into the case for the purposes of loop flushing. The amount of flow through the valve 42 primarily depends upon the cross-section of the opening through the valve (shown as a fixed orifice 52), the pressure differential across the valve, and the viscosity of the oil. Orifices or valves with different cross-sections can be selected for different loop flushing flow amounts.

Another advantageous feature of the present invention is that the microcontroller 22A can be programmed to only generate a signal to the loop flushing valve 42 when predetermined operating system conditions or input. values are achieved. These conditions or values can include, but are not limited to, a given pump displacement, motor speed, joystick position, or other input signal. As best seen in FIG. 4, the point F at which loop flushing commences can therefore be moved along the x axis merely by reprogramming the microcontroller 22A. The signal to the loop flushing valve 42 also can be defeated when the fluid displacement in the transmission is within a given range around zero displacement. For instance, the microcontroller 22A can be programmed so that no current is sent to the loop flushing valve 42 to bleed fluid for loop flushing until the vehicle is driving forward with more than 50% of its maximum pump displacement or motor speed. Since the loop flushing valve 42 connects to only one of the system pressure lines, loop flushing occurs in only one direction of vehicle movement.

Thus, the present invention at least achieves its stated objectives.

What is claimed is:
1. A loop flushing circuit comprising:
a variable displacement hydraulic pump;
a hydraulic motor fluidly connected to the pump in a closed loop circuit by first and second system pressure lines;
the first and second system pressure lines each having a respective pressure therein, one of the first and second system lines having lower pressure therein than the other of the first and second system pressure lines whenever the pump has a non-zero displacement;
a case drain line associated with at least one of the motor and the pump;
a two-port loop flushing valve having an inlet port fluidly connected to only one of the first and second system pressure lines and having an outlet port selectively connected to the case drain line;
the loop flushing valve having an open first position wherein the system pressure line to which the inlet port is connected and the case drain line are fluidly connected; and
the loop flushing valve having a closed second position wherein fluid flow between the system pressure line to which the inlet port is connected and the case drain line is blocked in two directions by the valve.

2. The circuit of claim 1 wherein the loop flushing valve is a solenoid-operated two-position electro-hydraulic valve.

3. The circuit of claim 2 comprising:
a microcontroller connected to the pump for controlling the displacement of the pump and direction of fluid flow in the closed loop circuit;
the microcontroller being electrically connected to the solenoid-operated loop flushing valve and generating a signal to open the loop flushing valve whenever a predetermined system condition is achieved.

4. The circuit of claim 2 wherein the loop flushing valve includes a solenoid and a biasing spring operatively opposing the solenoid such that the loop flushing valve is normally spring biased into the closed position in the absence of current to the solenoid.

5. The circuit of claim 1 wherein the pump is a bi-directional pump such that direction of fluid flow in the closed loop circuit can be reversed.

6. The circuit of claim 1 wherein the inlet port of the loop flushing valve is fluidly connected only to the system pressure line having lower pressure.

7. The circuit of claim 1 wherein the motor is a fixed displacement motor.

8. A loop flushing circuit comprising:
a variable displacement hydraulic pump;
a hydraulic motor fluidly connected to the pump in a closed loop circuit by first and second system pressure lines;
the first and second system pressure lines each having a respective pressure therein, one of the first and second system lines having lower pressure therein than the other of the first and second system pressure lines whenever the pump has a non-zero displacement;
a case drain line associated with at least one of the motor and the pump;
a two-port loop flushing valve having an inlet port fluidly connected to only one of the first and second system pressure lines and having an outlet port selectively connected to the case drain line;
the loop flushing valve having an open first position wherein the system pressure line to which the inlet port is connected and the case drain line are fluidly connected;
the loop flushing valve having a closed second position wherein fluid flow between the system pressure line to which the inlet port is connected and the case drain line is blocked by the valve;

wherein the loop flushing valve is a solenoid-operated two-position electro-hydraulic valve;

a microcontroller connected to the pump for controlling the displacement of the pump and direction of fluid flow in the closed loop circuit;

the microcontroller being electrically connected to the solenoid-operated loop flushing valve and generating a signal to open the loop flushing valve whenever a predetermined system condition is achieved; and wherein the predetermined system condition is a given value of pump displacement.

9. A loop flushing circuit comprising:

a variable displacement hydraulic pump;

a hydraulic motor fluidly connected to the pump in a closed loop circuit by first and second system pressure lines;

the first and second system pressure lines each having a respective pressure therein, one of the first and second system lines having lower pressure therein than the other of the first and second system pressure lines whenever the pump has a non-zero displacement;

a case drain line associated with at least one of the motor and the pump;

a two-port loop flushing valve having an inlet port fluidly connected to only one of the first and second system pressure lines and having an outlet port selectively connected to the case drain line;

the loop flushing valve having an open first position wherein the system pressure line to which the inlet port is connected and the case drain line are fluidly connected;

the loop flushing valve having a closed second position wherein fluid flow between the system pressure line to which the inlet port is connected and the case drain line is blocked by the valve;

wherein the loop flushing valve is a solenoid-operated two-position electro-hydraulic valve;

a microcontroller connected to the pump for controlling the displacement of the pump and direction of fluid flow in the closed loop circuit;

the microcontroller being electrically connected to the solenoid-operated loop flushing valve and generating a signal to open the loop flushing valve whenever a predetermined system condition is achieved; and wherein the predetermined system condition is a given hydraulic motor speed.

10. A loop flushing circuit comprising:

a variable displacement hydraulic pump;

a hydraulic motor fluidly connected to the pump in a closed loop circuit by first and second system pressure lines;

the first and second system pressure lines each having a respective pressure therein, one of the first and second system lines having lower pressure therein than the other of the first and second system pressure lines whenever the pump has a non-zero displacement;

a case drain line associated with at least one of the motor and the pump;

a two-port loop flushing valve having an inlet port fluidly connected to only one of the first and second system pressure lines and having an outlet port selectively connected to the case drain line;

the loop flushing valve having an open first position wherein the system pressure line to which the inlet port is connected and the case drain line are fluidly connected;

the loop flushing valve having a closed second position wherein fluid flow between the system pressure line to which the inlet port is connected and the case drain line is blocked by the valve;

wherein the loop flushing valve is a solenoid-operated two-position electro-hydraulic valve;

a microcontroller connected to the pump for controlling the displacement of the pump and direction of fluid flow in the closed loop circuit;

the microcontroller being electrically connected to the solenoid-operated loop flushing valve and generating a signal to open the loop flushing valve whenever a predetermined system condition is achieved;

a joystick electrically connected to the microcontroller for sending an operator input signal indicative of a desired pump displacement and direction of fluid flow to the microcontroller; and wherein the predetermined system condition is a given joystick position.

11. A loop flushing circuit comprising:

a variable displacement hydraulic pump;

a hydraulic motor fluidly connected to the pump in a closed loop circuit by first and second system pressure lines;

the first and second system pressure lines each having a respective pressure therein, one of the first and second system lines having lower pressure therein than the other of the first and second system pressure lines whenever the pump has a non-zero displacement;

a case drain line associated with at least one of the motor and the pump;

a two-port loop flushing valve having an inlet port fluidly connected to only one of the first and second system pressure lines and having an outlet port selectively connected to the case drain line;

the loop flushing valve having an open first position wherein the system pressure line to which the inlet port is connected and the case drain line are fluidly connected;

the loop flushing valve having a closed second position wherein fluid flow between the system pressure line to which the inlet port is connected and the case drain line is blocked by the valve; and wherein the case drain line is in the motor and loop flushing valve is mounted on the motor.

12. A loop flushing circuit comprising:

a variable displacement hydraulic pump;

a hydraulic motor fluidly connected to the pump in a closed loop circuit by first and second system pressure lines;

the first and second system pressure lines each having a respective pressure therein, one of the first and second system lines having lower pressure therein than the other of the first and second system pressure lines whenever the pump has a non-zero displacement;

a case drain line associated with at least one of the motor and the pump;

a two-port loop flushing valve having an inlet port fluidly connected to only one of the first and second system pressure lines and having an outlet port selectively connected to the case drain line;

the loop flushing valve having an open first position wherein the system pressure line to which the inlet port is connected and the case drain line are fluidly connected;

the loop flushing valve having a closed second position wherein fluid flow between the system pressure line to which the inlet port is connected and the case drain line is blocked by the valve; and wherein the loop flushing valve includes a fixed orifice in the open first position of said valve for restricting loop flushing flow through said valve in the open first position.

13. A loop flushing circuit comprising:

a bi-directional variable displacement hydraulic pump;

a hydraulic motor fluidly connected to the pump in a closed loop circuit by first and second system pressure lines;

the first and second system pressure lines each having a respective pressure therein, one of the first and second system lines having lower pressure therein than the other of the first and second system pressure lines whenever the pump has a non-zero displacement;

a case drain line associated with at least one of the motor and the pump;

a solenoid-operated two-position loop flushing valve having an inlet port fluidly connected to only one of the first and second system pressure lines and having an outlet port selectively connected to the case drain line;

the loop flushing valve having an open first position wherein the system pressure line to which the inlet port is connected and the case drain line are fluidly connected; and the loop flushing valve having a closed second position wherein fluid flow between the system pressure line to which the inlet port is connected and the case drain line is blocked in two directions by the valve;

a microcontroller connected to the pump for controlling the displacement of the pump and direction of fluid flow in the closed loop circuit; and the microcontroller being electrically connected to the solenoid-operated loop flushing valve and generating a signal to change the position of the loop flushing valve whenever a predetermined system condition is achieved.

14. In combination with a hydrostatic transmission that includes a hydraulic pump and a hydraulic motor connected in a closed loop circuit by a pair of system pressure lines, one of the system pressure lines being a low pressure system line during non-neutral operation of the transmission, a loop flushing valve consisting of:

an electrically-actuated two-port non-feedback loop flushing valve having an inlet port fluidly connected to the low pressure system line and having an outlet port selectively connected to a case drain line; the loop flushing valve having an open first position wherein the low pressure system line and the case drain line are fluidly connected; the loop flushing valve having a closed second position wherein fluid flow between the low pressure system line and the case drain line is blocked in two directions by the valve; and whereby loop flushing occurs without the aid of a shuttle valve or check valves for identifying the low pressure system line.

* * * * *